(12) United States Patent
Sauer et al.

(10) Patent No.: US 6,333,482 B1
(45) Date of Patent: Dec. 25, 2001

(54) METHOD FOR PRODUCING CAN BODIES MADE OF SHEET METAL FOR THE MANUFACTURE OF CANS

(75) Inventors: Reiner Sauer; Karl-Heinz Kern, both of Neuwied (DE)

(73) Assignee: Rasselstein Hoesch GmbH, Andernach (DE)

( * ) Notice: Subject to any disclaimer, the term of this patent is extended or adjusted under 35 U.S.C. 154(b) by 0 days.

(21) Appl. No.: 09/437,633

(22) Filed: Nov. 10, 1999

(30) Foreign Application Priority Data

Nov. 13, 1998 (DE) .............................. 198 52 342

(51) Int. Cl.⁷ .................................. B23K 26/00
(52) U.S. Cl. ............... 219/121.63; 219/121.64; 219/121.67; 219/121.72; 219/121.76
(58) Field of Search .................. 219/121.63, 121.64, 219/121.67, 121.72, 121.76; 413/1, 69

(56) References Cited

U.S. PATENT DOCUMENTS

| 4,315,132 | * | 2/1982 | Saurin et al. | ................. 219/121 LD |
| 5,430,270 | * | 7/1995 | Findlan et al. | ................. 219/121.63 |
| 5,653,899 | * | 8/1997 | Odake et al. | .................... 219/121.64 |
| 5,658,473 | * | 8/1997 | Ziemek | ............................ 219/121.64 |
| 5,731,566 | * | 3/1998 | Steinhart | ......................... 219/121.63 |
| 5,997,232 | * | 12/1999 | Sauer | ......................................... 413/1 |
| 6,034,347 | * | 3/2000 | Alber et al. | ...................... 219/121.64 |

FOREIGN PATENT DOCUMENTS

| 19702265 | * | 7/1998 | (DE) | .............................. B21D/51/26 |
| 197 02 265 | | 7/1998 | (DE) . | |

* cited by examiner

Primary Examiner—M. Alexandra Elve
(74) Attorney, Agent, or Firm—Flynn, Thiel, Boutell & Tanis, P.C.

(57) ABSTRACT

A method for producing can bodies made of sheet metal for the manufacture of cans includes a step of bringing together and placing one on top of the other of two sheet metal strips. The sheet metal strips, which are placed one on top of the other, are joined by means of several joint welds which extend continuously in the longitudinal direction of the strip through continuous moving of the sheet metal strips past a laser welding device which has several laser heads arranged at corresponding mutual spacings. The sheet metal strips, which are welded together, are longitudinally cut by laser cutting along each weld joint in order to produce several adjacent flat tubes. The welding and the longitudinal cutting are effected simultaneously with one laser head respectively.

10 Claims, 2 Drawing Sheets

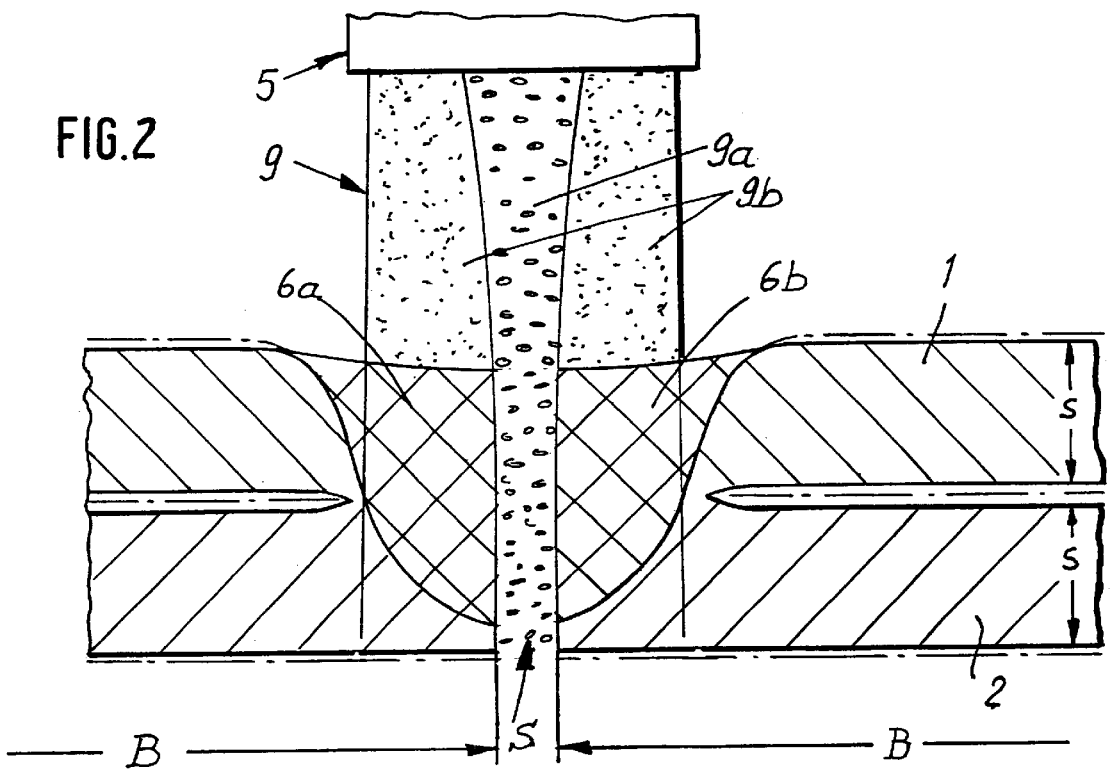

METHOD FOR PRODUCING CAN BODIES MADE OF SHEET METAL FOR THE MANUFACTURE OF CANS

FIELD OF THE INVENTION

The invention relates to method for producing can bodies made of sheet metal for the manufacture of cans by bringing together and placing one on top of the other of two sheet metal strips which have been rolled to a finished thickness and the width of which is a multiple of half of the circumference of a can body, joining of the sheet metal strips, which are placed one on top of the other, by means of several joint welds which extend continuously in the longitudinal direction of the strip, the mutual spacing of which welds in the transverse direction of the strip corresponds to half of the body circumference, by continuous moving of the sheet metal strips, which are placed one on top of the other, past a laser welding device which has several laser heads arranged at corresponding mutual spacings, longitudinal cutting of the sheet metal strips, which are welded together, by laser cutting along each weld joint in order to produce several adjacent flat tubes, possibly rolling up of the flat tubes for interim storage and/or transportation, unrolling of the possibly rolled-up flat tubes, cutting of the flat tubes into flat tube sections, the length of which corresponds roughly to the height of the can, and spreading of the individual flat tube sections into one, especially cylindrical, can body respectively.

BACKGROUND OF THE INVENTION

A method of this type is known from DE 197 02 265 A1. In the case of this known method, the mutual welding of the sheet metal strips and the longitudinal cutting of the sheet metal strips, which are welded together, is effected in two successive operational steps. At each welding station, the two sheet metal strips are first of all welded together by means of several laser heads which are arranged next to one another so that said metal strips firstly form flat tubes, which are connected to one another, along the joint welds. At a cutting station assigned to the welding station at a spacing, the sheet metal strips are then separated from one another by means of cutting lasers along the centre of each joint weld. Several flat tubes, which are arranged adjacently and separated from one another by cuts, are thus produced and wound up into cylinders. The cylinders are then delivered to a filling machine where they are cut into lengths by relatively simple machines and spread into can bodies. The technical costs for carrying out this known method are relatively high because separate laser heads are required for welding and for cutting respectively. By adjusting the mutual spacing of the laser heads in the direction of the strip, the width of the flat tubes to be produced can be altered to the respectively desired diameter of the can bodies to be manufactured later therefrom. Provision must be made thereby that the mutual spacing of the welding lasers corresponds absolutely precisely to the mutual spacing of the cutting lasers. In addition, the cutting lasers must be in exact alignment with the welding lasers in the longitudinal direction of the strip since otherwise the cutting lasers do not cut apart the previously produced joint welds exactly in the centre.

SUMMARY OF THE INVENTION

The object underlying the invention is thus to improve the method mentioned initially for producing can bodies made of sheet metal for the manufacture of cans such that the method can be carried out with lower technical expenditure and also with greater operational reliability and manufacturing precision.

This is achieved according to the invention in that the welding and the longitudinal cutting are effected simultaneously with one and the same laser head respectively, the laser beam of which has an inner beam path of high energy density for the longitudinal cutting and a beam path of lower energy density for welding the regions of the sheet metal strips which are placed one on top of the other and situated on both sides of the cut.

The invention starts thus from the idea of carrying out the mutual welding of the two sheet metal strips and the longitudinal cutting respectively at the same time and in the same place by means of one single laser head, the laser beam of which has a corresponding energy density distribution. As a result, the device for carrying out the method is substantially simpler because a second laser head, which in the case of the method used to date was only provided for the longitudinal cutting is dispensed with. In addition, there are no problems with the new method with respect to the exact adjustment of the cutting laser relative to the assigned welding laser because the welding and the cutting are performed by one and the same laser beam. As a result, adjustment operations are simplified, the operational reliability of the method is improved and the operational precision is also increased.

BRIEF DESCRIPTION OF THE DRAWINGS

The method according to the invention is explained subsequently in more detail with reference to the enclosed drawings, which show.

DETAILED DESCRIPTION OF THE INVENTION

Figure 1:
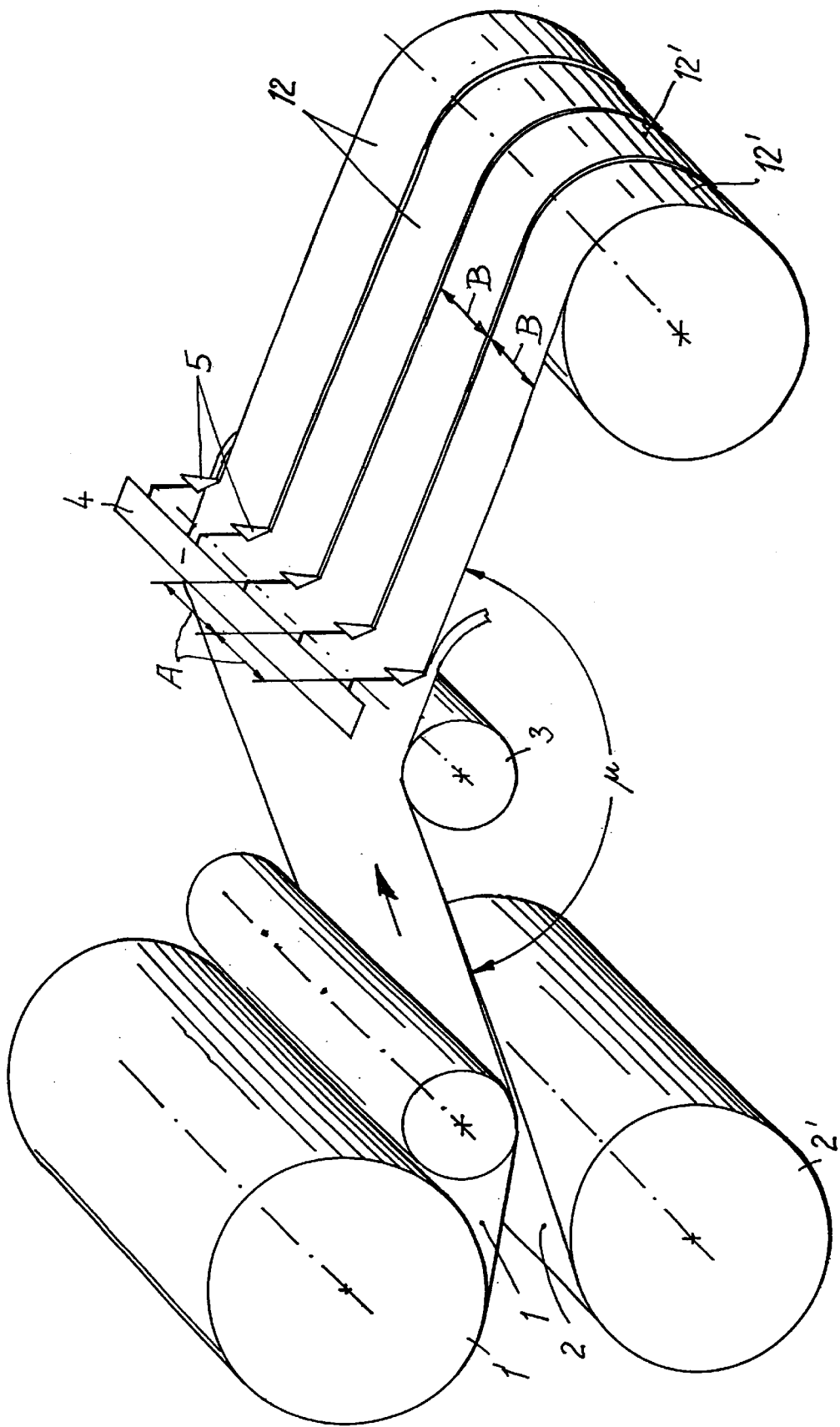
FIG. 1 the schematic representation of the first method steps of the method according to the invention, FIG. 2 a cross-section of the sheet metal strips in the region of the cutting laser in greatly enlarged scale.

In order to carry out the method, tinplate (tinned black plate), chrome-plated black plate or also bright sheet metal made of steel in a thickness range of 0.05–0.49 mm can be used. The strength of the steel plate can be in the range between 200 and more than 1000 N/mm$^2$. The steel plate can have an organic coating on one side or both sides which coating is applied in a known manner as a coat of lacquer, as a plastic membrane or also by direct extrusion. If required, the coating can have recesses also in the region of the later welds. Sheet metal strips which are made of metals other than steel, e.g. aluminium, can also be used.

As is evident from FIG. 1, two strips 1, 2 which come from two rollers 1', 2' are brought together and thereby placed one upon the other. The strips 1, 2 can thereby have a width of for example 1200 mm. The sheet metal strips 1, 2 which are placed one on top of the other, are guided together under tension over a deflecting roller 3 such that the strip sections extending in front of and behind the deflecting roller 3 form together an obtuse deflection angle $\mu$. The tension in both strips 1, 2 is produced in that the rollers 1', 2' are reduced in speed during unwinding of the sheet metal strips 1, 2 as a result of which a so-called back-pull is produced and, on the other hand, the flat tubes 12 formed from the sheet metal strips 1, 2 are rolled up under tension, as a result of which a so-called forward-pull is produced. By means of the counter-effect of back-pull and forward-pull, a tension is produced in the sheet metal strips, which are placed one on top of the other, and, due to the simultaneous deflection of the sheet metal strips 1, 2 by means of the deflecting roller 3, the sheet metal strips are pressed firmly one on top of the other in the region of the deflecting roller 3. If necessary, pressure rollers, which are not illustrated, can also have an effect from above.

In the region of the deflecting roller 3 or also adjacent to the latter there is arranged a laser welding device 4 which has several laser heads 5. The mutual spacing A of the laser heads is adjustable. The laser heads 5 are configured such that each of them can mutually weld the two sheet metal strips 1, 2 and cut them apart in the longitudinal direction of the strip. The sheet metal strips 1, 2 which are placed one on top of the other and pressed together, are guided along underneath the laser heads 5 at a speed of approx. 20–100 m/min. Each laser head 5 transmits, as is illustrated in FIG. 2, a laser beam 9 with an inner beam path 9a at high energy density and an outer beam path 9b of lesser energy density. The energy density of the inner beam path 9a is adjusted such that both sheet metal strips 1, 2 are cut lengthwise to their full sheet metal thickness s respectively. The energy density of the outer beam path 9b is chose such that the sheet metal strips 1, 2 which are placed one on top of the other, are welded together lengthwise on both sides of the cut s which is produced by the inner beam path 9a, by joint welds 6a, 6b.

The laser welding takes place from the start of the strip to the end of the strip continuously. The spacing B of the joint welds 6a, 6b which is determined by the spacing A of the laser welding heads 5 corresponds substantially to half of the circumference of the can body to be produced according to the formula, B =0.5×D ×π. The outer weld joints have a spacing from the strip edges of at least 2 mm so that edge trimming is possible.

Several flat tubes 12 which are separated from one another are produced by the laser welding and cutting, on the longitudinal edges of which flat tubes the upper sheet metal part 1 is joined together to the lower sheet metal strip part 2 via the joint welds 6a, 6b. The flat tubes 12, the length of which corresponds to the length of the strip, which may be between 1,000 and 10,000 m, are rolled up on cylinders 12'. The cylinders 12' can then be stored in the interim and delivered to a filling machine or also to a can maker. By simple displacement of the laser heads 5 in the direction of the strip, the width B of the produced flat tubes 12 can be adjusted in accordance with the desired can diameter. The width B corresponds thereby to 0.5×D ×π+2 xs. The joining of the two sheet metal strips 1, 2 by laser welding also permits thereby the presence of organic coatings in the welding joint so that organic coating on the sheet metal strips 1, 2 can be continuous.

What is claimed is:

1. A Method for producing can bodies made of sheet metal for the manufacture of cans by:

bringing together and placing one on top of the other of two sheet metal strips which have been rolled to a finished thickness and a width that is a multiple of half of the circumference of a can body, simultaneously joining and cutting the two sheet metal strips by continuous moving of the sheet metal strips past a laser device having several spaced apart laser heads capable of simultaneously welding and cutting the strips, wherein spacing of the welds and cuts in the transverse direction of the strip corresponds to half of the can body circumference, whereby longitudinal cutting of the sheet metal strips to produce several adjacent flat tubes is performed simultaneously with the welding of the sheet metal strips by each of the several laser heads, a laser beam from each of the several laser heads having an inner beam path of high energy density for the longitudinal cutting and an outer beam path of lower energy density for welding the sheet metal strips on both sides of the cut.

2. The method of claim 1, including a step of rolling up the flat tubes.

3. The method of claim 2, including a step of transporting the flat tubes.

4. The method of claim 2, including a step of storing the flat tubes.

5. The method of claim 2, including a step of unrolling the flat tubes.

6. The method of claim 1, including a step of cutting the flat tubes into flat tube sections having a length that corresponds roughly to the height of the can body.

7. The method of claim 6, including a step of spreading each of the flat tube sections into a can body.

8. The method of claim 1, including a step of displacing the laser heads to adjust the spacing of the welds.

9. The method of claim 1, including a step of guiding the sheet metal strips under tension over a deflecting roller.

10. The method of claim 9, wherein the step of guiding the sheet metal strips includes the steps of:

unrolling the two sheet metal strips to be welded and cut into the flat tubes; and rolling up the flat tubes.

* * * * *